United States Patent [19]

Ackley et al.

[11] Patent Number: 5,545,359
[45] Date of Patent: Aug. 13, 1996

[54] METHOD OF MAKING A PLASTIC MOLDED OPTOELECTRONIC INTERFACE

[75] Inventors: Donald E. Ackley, Lambertville, N.J.; Michael S. Lebby, Apache Junction, Ariz.

[73] Assignee: Motorola, Schaumburg, Ill.

[21] Appl. No.: 288,854

[22] Filed: Aug. 11, 1994

[51] Int. Cl.⁶ ................................................ B29D 11/00
[52] U.S. Cl. .................. 264/1.24; 264/1.9; 264/272.15; 385/129
[58] Field of Search ........................... 264/1.7, 1.9, 1.24, 264/1.25, 272.14, 272.15; 385/14, 88, 92, 129

[56] References Cited

U.S. PATENT DOCUMENTS

| | | |
|---|---|---|
| 5,044,720 | 9/1991 | Haley et al. . |
| 5,071,223 | 12/1991 | Gotoh et al. ........................... 385/14 |
| 5,271,083 | 12/1993 | Lebby et al. . |
| 5,337,391 | 8/1994 | Lebby . |
| 5,369,529 | 11/1994 | Kuo et al. . |

*Primary Examiner*—Mathieu D. Vargot
*Attorney, Agent, or Firm*—Gary F. Witting

[57] ABSTRACT

An article and method for making a plastic molded optoelectronic interface are provided. A leadframe having a first segment and a second segment with the first segment having a first tab and the second segment having a second tab is provided. The first and the second tabs extend away from the first segment and the second segment, respectively, and toward each other. The first segment and the second segment are positioned in a parallel configuration with the first and second tabs pointing toward each other. A first optical portion having a reflective surface with an angle is formed between the first tab of the first segment and the second tab of the second segment. A second optical portion that surrounds the first optical portion is formed.

16 Claims, 3 Drawing Sheets

5,545,359

METHOD OF MAKING A PLASTIC MOLDED OPTOELECTRONIC INTERFACE

BACKGROUND OF THE INVENTION

This invention relates, in general, to optical devices and, more particularly, to fabrication of molded waveguides and their use.

At the present time, optical waveguides, photonic devices, land standard electronic components are not effectively integrated for several reasons, such as difficulty in manufacture, difficulty in assembly, and the like. For example, fabrication of optical waveguides is achieved by either a polymer spin-on technique or a diffusion technique, both of which require expensive lithography steps. Further, both fabrication techniques provide a planar waveguide structure that does not easily enable light signals that are perpendicular to the planar structure to couple into the waveguide, thus not enabling some photonic devices to be utilized easily with planar waveguides. Moreover, both fabrication techniques are ineffective and inefficient for manufacturing waveguides in high volumes for several reasons, such as complex processing steps, difficulties in controlling the processing steps, and the high cost of doing these processing steps.

Briefly, as practiced by one method in the prior art, a polymeric film is spun on a substrate. A portion of the polymeric film is subsequently exposed to light by a photolithographic process, thereby changing the refractive index of the polymeric film and creating a waveguide in the polymeric film. However, subsequent multi-step processing for making the waveguide useful, such as removal of the polymeric film from the substrate, lamination processing, curing processing, and other processes typically are required for the waveguide to be useful. Additionally, it should be pointed out that use of this method for manufacturing waveguides does not lend itself for coupling light signals that are perpendicular to the waveguide. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated lithographic process, thereby producing portions that are masked and portions that are open or clear. Typically, ions are subsequently diffused into the open portion of the layer, thus changing the refractive index of the layer and making a waveguide. However, by using the photolithography process, a high cost is incurred into manufacture of the waveguide. Once again, the waveguide fabricated by this method does not have any provisions for enabling light signals that are perpendicular to the waveguide to be coupled to the waveguide. Additionally, use of this particular method for manufacturing waveguides incurs a high cost of manufacture for several reasons, such as complexity of processing steps, number of processing steps, and the like.

It can be readily seen that conventional methods for making waveguide have severe limitations, while not readily enabling light signals that are perpendicular to the waveguide to be coupled. Also, it is evident that conventional processing uses a multitude of steps which are complex and expensive, thereby making the manufacture of conventional waveguides expensive. Therefore, a method for making a waveguide that enables light signals that is perpendicular to the waveguide to be coupled would be highly desirable.

SUMMARY OF THE INVENTION

Briefly stated, a method for making and a plastic molded optoelectronic interface is provided. A leadframe having a first segment and a second segment with the first segment having a first tab and the second segment having a second tab is provided. The first and the second tabs extend away from the first segment and the second segment, respectively, and toward each other. The first segment and the second segment are positioned in a parallel configuration with the first and second tabs pointing toward each other. A first optical portion having a reflective surface with an angle is formed between the first tab of the first segment and the second tab of the second segment. A second optical portion is formed that surrounds the first optical portion.

DETAILED DESCRIPTION OF THE DRAWINGS

Figure 1:
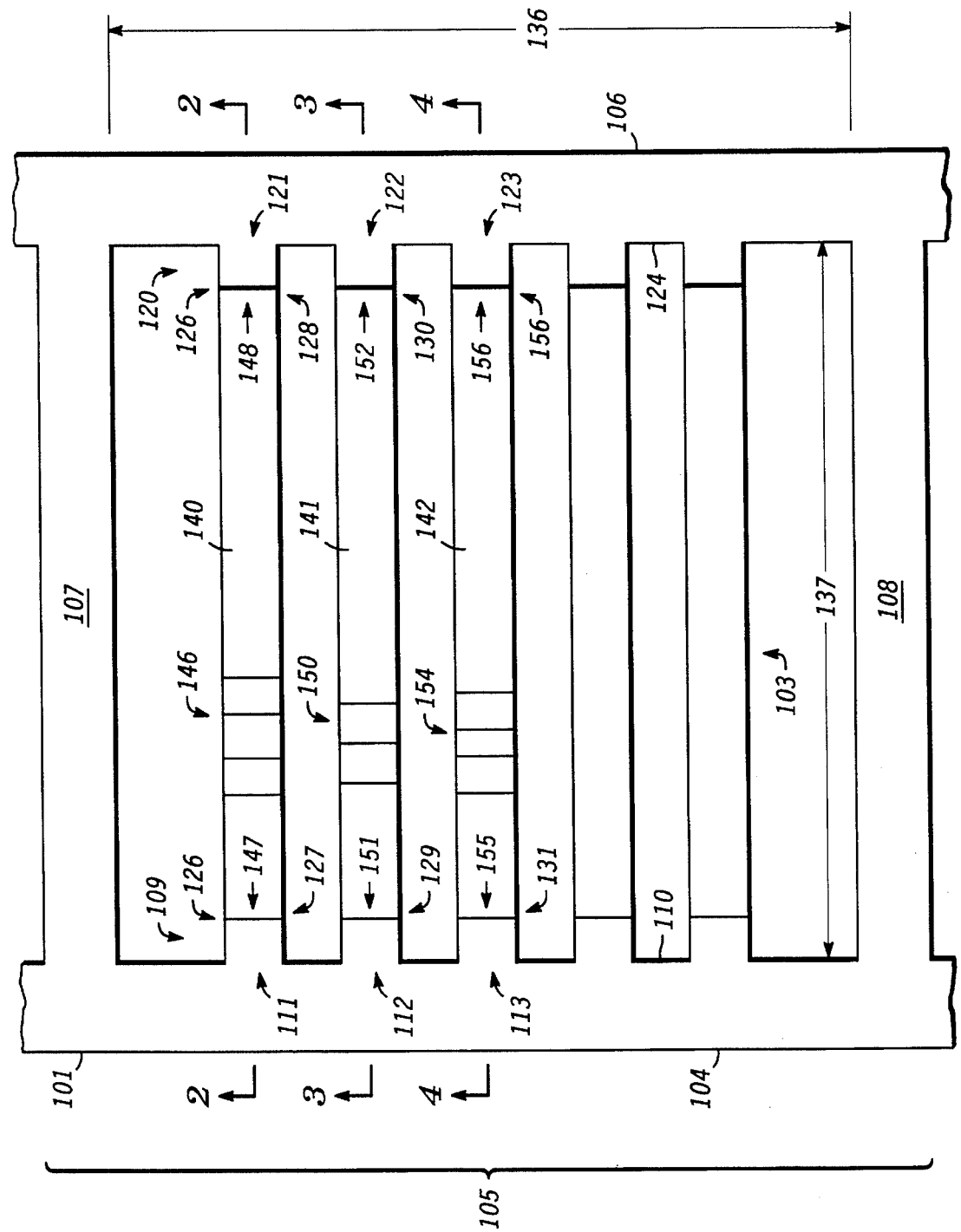
FIG. 1 is an enlarged simplified illustration of a plan view of a leadframe having optical portions.

FIG. 1 is an enlarged simplified illustration of a plan view of a portion 100 of a support structure 101 having a plurality of optical portions 103 positioned in a frame 105. As shown in FIG. 1, portion 100 of support structure 101 is broken off and continues with additional frames that repeat.

Frame 105 is made of several elements or features, such as a first segment 104 having a first side 110 with a first plurality of tabs or tabs 109 with identified individual tabs 111, 112 and 113, a second segment 106 having a second side 124 with a second plurality of tabs or tabs 120 with identified individual tabs 121, 122, and 123, a first cross member 107, and a second cross member 108. Further, as shown in FIG. 1, the plurality of optical portions 103 are made with features that include individual optical portion 140, 141, and 142. Moreover, optical portions 140, 141, and 142 include optical elements or optical devices 146, 150, and 154, with ends 147 and 148, 151 and 152, and 155 and 156, respectively. The plurality of optical portions 103 is joined to the pluralities of tabs 109 and 120 by a plurality of joints 126 individually identified as joints 127–132.

Generally, frame 105 is formed with first segment 104 having the plurality of tabs 109 that extend away from first segment 104 on side 110 and second segment 106 having the plurality of tabs 120 that extend away from second segment 120 on side 124 being positioned in parallel with the plurality of tabs 109 and the plurality of tabs 120 directed toward each other. Cross members 107 and 108 extend between first and second segments 104 and 106, thereby completing frame 105.

Generally, frame 105 is made of any suitable material, such as a metal, a plastic, a resin, or the like. However, in a preferred embodiment of the present invention, frame 105 is made of metal material, such as a metal leadframe well known in the semiconductor art. Selection of the metal leadframe is based on availability of technology of preparing and configuring metal leadframes; however, molding of plastic and resin based leadframes are equally suitable. Further, any suitable method of manufacture of frame 105 may be used, such as molding, stamping, cutting, etching, or the like. Generally, selection of the method of manufacture is dependent upon the material used in forming of frame 105.

Frame 105 is made in any suitable size and configuration, thereby enabling a variety of application to be fulfilled. Generally, side 110 and side 124 have a dimension or a distance 136 of less than or equal to 10.0 cm. Additionally, cross members 107 and 108 having a dimension or a distance 137 are also made having any suitable size, however, dimension 137 is typically less than or equal to 10.0 cm. However, since frame 105 typically approximates the size of a metal leadframe, in a preferred embodiment of the present invention, distances 136 and 137 are less than or equal to 5.0 cm.

Generally, any suitable process is used to make optical portions 103, such as laser ablating, milling, or the like; however, in a preferred embodiment of the present invention, optical portions 103 are formed by molding. Briefly, support structure 101 having frame 105 is placed in a cavity of a molding system. The cavity of the molding system is manufactured to accommodate at least a portion of frame 105 with negative relief patterns or negative images that depict a desired shape or shapes of optical portions 103 contained in the cavity of the molding system. For example, when frame 105 having tabs 111 and 121 is placed into the cavity of the molding system, a channel is depicted in the cavity that extends from tab 111 to tab 121. Thus, the channel in the cavity of the molding system provides the negative image of optical portion 140 yet to be formed. Once optical portion 140 is formed between tabs 111 and 121, optical portion 140 is secured by joints 147 and 148 that are butt joints.

In yet another example, when frame 105 having tabs 112 and 122, and tabs 113 and 123, respectively, are placed into the cavity of the molding system, channels are depicted in the cavity that extend from tabs 112 and 122, and tabs 113 and 123, thereby enabling molding compound to overmold tabs 112 and 122, and tabs 113 and 123. Moreover, the negative relief images of the cavity also include images of optical elements 146, 150, and 154 that are formed simultaneously with the formation of optical portions 103. Thus, in general, the plurality of optical portions 103 having ends 147, 148, 151, 152, 155, and 156 and the plurality of tabs 109, and 120 form the plurality of joints 126, thereby securing the plurality of optical portions 103 to frame 105.

In general, molding compound or molding material is injected into the cavity of the molding system, thus forming the plurality of optical portions 103. The plurality of optical portion 103 generally are made of any hard optically transparent polymer, such as polyimides, plastics, epoxies, polymers, or the like. However, in a preferred embodiment of the present invention, the plurality of optical portions 103 are made of an epoxy material.

Generally, the molding material selected is optically transparent (in final form) having refractive indexes that range from 1.3 to 1.7; however, in a preferred embodiment of the present invention, the refractive index ranges from 1.45 to 1.65. Processing conditions for these materials range from 22.0 to 200.0 degrees Celsius for molding temperatures and 200.0 to 2200.0 pounds per square inch for molding pressures. By injecting molding material into the cavity of the molding system, the negative images or intricacies of the cavity are transferred to optical portions 103. Typically, a subsequent curing process, such as an ultra-violet radiation treatment, a thermal cycling treatment, or a combination of both ultra violet radiation and thermal treatments, or the like are done to solidify and fully form the molding compound so as to realize optical portions 103. Further, it should be understood that sometimes a post-mold curing process is needed to maximize optical and physical qualities such as refractive index, physical strength, and the like of the molding materials.

Once the molding and the curing processes are completed, the frame 105 and the plurality of optical portions 103 attached thereto are removed from the cavity of the molding system for subsequent processing discussed hereinafter.

Further, it should be understood that several advantages are obtained by utilizing support structure 101, such as ease of handling, structural support, alignment capability, and the like, thereby enhancing automation of the molding process. Further, use of support structure 101 facilitates robotic handling so as to be able to easily move support structure 101 with the plurality of optical portions 103 from one processing station to another processing station, thus automating and facilitating manufacturing.

Figure 2:
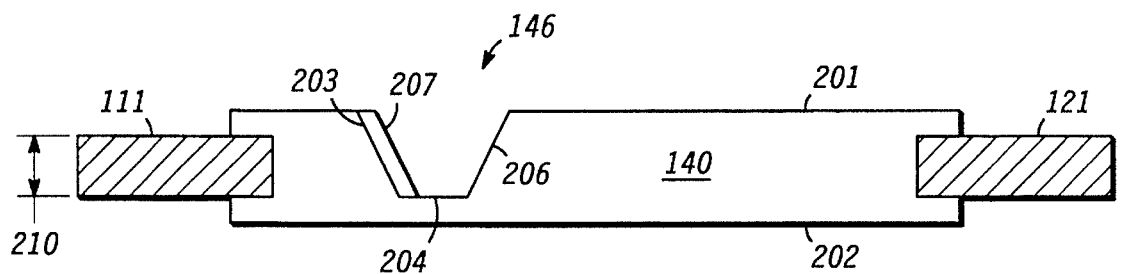
FIG. 2 is an enlarged simplified illustration of a sectional view through 2—2 of the leadframe shown in FIG. 1.

FIG. 2 is a simplified enlarged sectional view of a portion of optical portion 140 and tabs 111 and 121 sectioned through 2—2 of FIG. 1. It should be understood that similar features or elements described hereinbefore with reference to FIG. 1 will retain their original identifying numerals.

As shown in FIG. 2, optical portion 140 is shown, in sectional view, after the molding, the curing, and the removing processes have been completed to optical portion 140. Tabs 111 and 121 are shown in part so as to better illustrate the present invention. Further, optical portion 140, as shown in FIG. 2, more clearly illustrates several elements or features including a surface 201, a surface 202, a reflective surface 203, a surface 204, and a surface 206.

As illustrated in FIG. 2, tabs 111 and 121 are now sectionally illustrated, thereby illustrating a thickness 210 of tabs 111 and 121. Any suitable thickness 210 is utilized to make tabs 111 and 121; however, typically, thickness 210 is equal to or less than a thickness of support structure 101 shown in FIG. 1. For example, thickness 210 of tabs 111 and 121 can range from 4.0 mils (0.0101 cm) to 10.0 mils (0.1253 cm) having a preferred range from 6.0 mils (0.0152) to 8.0 mils (0.020 cm).

Generally, optical portion 140 extends from tab 111 to tab 121 with optical element 146 being positioned between tab 111 and tab 121. While only one optical element 146 is shown, it should be understood that more than one optical element 146 can be molded into optical portion 140. Surfaces 201, 202, 204, 206, and reflective surface 203 are made simultaneously during molding of optical portion 140, thereby making optical portion 140 with surfaces 201, 202, 204, 206, and reflective surface 203 in one step. Thus, optical element 146 is accurately postioned in optical portion 140 by being able to repeatedly mold optical portion 140 from frame 105, as shown in FIG. 1, to repeated frames. Additionally, since the molding process is repeated, optical portion 140 is made in an inexpensive and accurate manner.

Optical element 146 is molded to provide reflective surface 201. Reflective surface 201 is shaped into any suitable form, such as a curved surface, parabolic surface, a partial parabolic surface, or the like. Shaping of reflective surface 210 in a curve provides better capture and directing of light signals into optical portion 140.

Further, a layer 207 provides enhanced reflective qualities to reflective surface 203. Layer 207 is made of any suitable reflective material, such as a metal, e.g., gold, silver, platinum, aluminum, or the like. Any suitable application method can be used for making layer 207, such as evaporation, sputtering, or the like. Further, materials having a different refractive index from that of optical portion 140, such as silicon dioxide, plastic, polyimide, or the like can also be used effectively. By positioning layer 207 on reflective surface 203, several advantages are provided, such as increased light reflection, increase light guiding, and the like.

Figure 3:
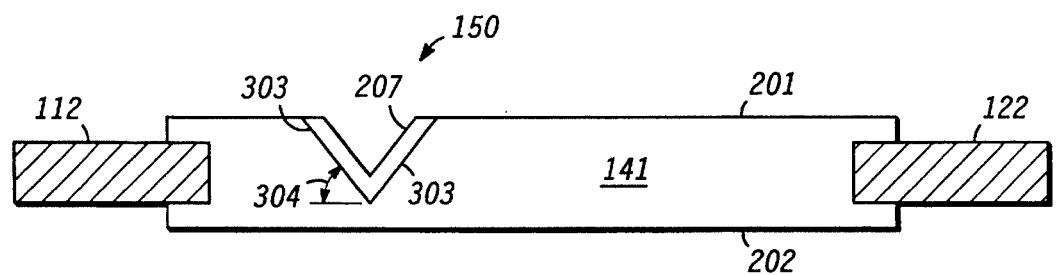
FIG. 3 is an enlarged simplified illustration of a sectional view through 3—3 of the leadframe shown in FIG. 1.

FIG. 3 is a simplified enlarged sectional view of a portion of optical portion 141 and tabs 112 and 122 sectioned through 3—3 of FIG. 1. It should be understood that similar features or elements described hereinbefore with reference to FIGS. 1 and 2 will retain their original identifying numerals.

As shown in FIG. 3, optical portion 141 is illustrated after completion of the molding, the curing, and the removing processes. Optical portion 141 is made having several elements or features including a surface 201, a surface 202, and reflective surfaces 303.

Optical element 150 is fabricated with reflective surfaces 303 in the shape of a V-groove, thus enabling reflection off of either one or both of reflective surfaces 303. Angle 304 of reflective surfaces 303 is set at any suitable angle. However, angle 304 can range from 10 to 85 degrees, with a preferred range from 35 to 55 degrees with a preferred angle of 45 degrees. As described hereinabove with reference to reflective layer 207 of FIG. 2, a reflective layer provided on surfaces 303 is made of any suitable material utilizing any suitable process for making layer 207.

Figure 4:
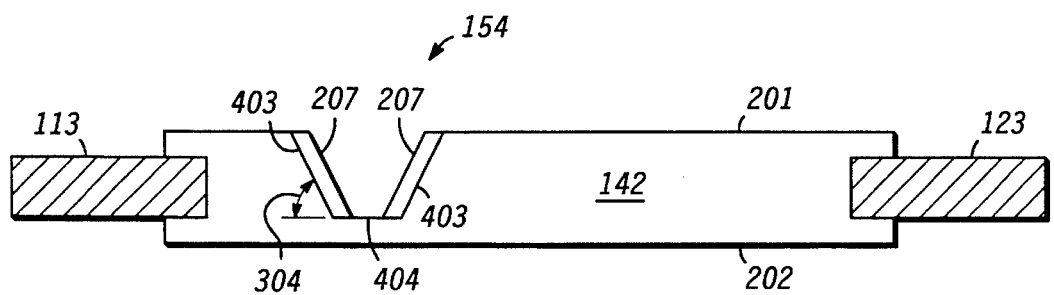
FIG. 4 is an enlarged simplified illustration of a sectional view through 4—4 of the leadframe shown in FIG. 1.

FIG. 4 is a simplified enlarged sectional view of a portion of optical portion 142 and tabs 113 and 123 sectioned through 4—4 of FIG. 1. It should be understood that similar features or elements described hereinbefore with reference to FIGS. 1, 2, and 3 will retain their original identifying numerals.

As shown in FIG. 4, optical portion 142 is shown, in sectional view, after the molding, the curing, and the removing processes have been completed and with optical portion 142 and tabs 111 and 121 being removed from the cavity of the molding system. Optical portion 142 is made having several elements or features including surface 201, surface 202, reflective surfaces 403, and a surface 404. Further, a thickness 210 of tabs 111 and 121 are clearly visible.

Optical element 154 is fabricated with reflective surfaces 403 in the shape of a groove with a connecting surface 404, thus enabling refection from either reflective surface 403. As previously described, angle 304 is set at any suitable angle. A reflective layer similar to layer 207, is provided on each reflective surface 403 and is made of any suitable material utilizing any suitable process for making layer 207.

Figure 5:
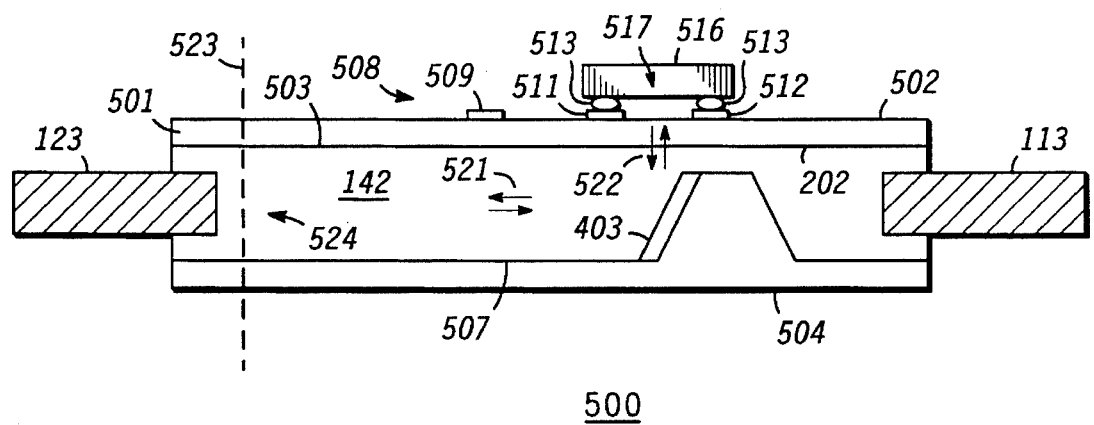
FIG. 5 is an enlarged simplified illustration of a sectional view of an optoelectronic interface device.

FIG. 5 is an enlarged simplified illustration of a sectional view through an optoelectronic interface device 500. For the sake of simplicity and for a better understanding of the present invention, similar features or elements described hereinbefore with reference to FIGS. 1, 2, 3, and 4 will retain their original identifying numerals. Further, optical portion 142 described hereinabove will serve as an example of an optical portion.

Optoelectronic interface device 500 is made of several elements or features, such as a second optical portion 501 having surfaces 502, 503, 504, and 507, a plurality of electrical traces 508 with individual electrical traces 509, 511, and 512, contacts 513, light signals 521 and 522, a dotted line 523, and a photonic device 516 with a working portion 517.

Generally, second optical portion 501 is molded in accordance with the description given for molding the plurality of optical portions 103 shown in FIG. 1. Briefly, optical portion 142 with tabs 113 and 123 is positioned in a cavity of a molding system having a negative image of second optical portion 501. Once optical portion 142 is positioned in the cavity of the molding system, a molding compound is injected into the cavity, thereby filling the cavity and transferring the negative images of the cavity to second optical portion 501.

Selected molding material forming second optical portion 501 has a refractive index that ranges from 1.3 to 1.7; however, the refractive index of the molding material is made so that the refractive index of optical portion 142 is higher than the refractive index of second optical portion 501, thereby enhancing light confinement and guiding. For example, the refractive index of optical portion 142 is at least 0.01 higher than the refractive index of second optical portion 501.

Generally, formation of second optical portion 501 is achieve so that second optical portion 501 surrounds optical portion 142 which then becomes an optical core. However, it should be understood that in some applications second optical portion 501 can be formed only on surface 202 of optical portion 142, thereby providing a partial cladding of optical portion 142.

Once second optical portion 501 is completed and removed from the molding system, the plurality of traces 508 is formed on surface 502 of second optical portion 501 by well-known methods in the art, thereby enabling electrical signals to be routed or conducted over surface 502 of second optical portion 501. As illustrated in FIG. 5, the plurality of electrical traces 508 include electrical trace 509, electrical trace 511, and electrical trace 512. Electrical trace 509 is an example of a conductive trace that moves electrical signals from one part of surface 502 to another part of surface 502, thereby allowing electrical interaction of other electrical components, such as integrated circuits, resistors, capacitors, and the like by electrical trace 509. Electrical traces or bonding pads 511 and 512 serve to provide electrical coupling between the plurality of electrical traces 508 and photonic device 516 through contacts 513, thereby operably coupling photonic device 516 to the plurality of electrical traces.

Photonic device 516 with a working portion 517 is either a phototransmitter or a photoreceiver that either emits light or receives light, respectively, as indicated by arrows 522. When photonic device 516 is a phototransmitter, the phototransmitter is capable of being any suitable light emitting device, such as a light emitting diode (LED), a vertical cavity surface emitting laser (VCSEL), or the like. When photonic device 516 is a photoreceiver, photonic device 516 is any suitable light receiving device, such as a photodiode, a p-i-n photodiode, or the like. However in a preferred embodiment of the present invention, when photonic device 516 is a phototransmitter, and when photonic device 516 is a photoreceiver, photonic device 516 is either a vertical cavity surface emitting laser (VCSEL) or a p-i-n photodiode, respectively.

Dotted line 523 illustrates a possible position where optoelectronic interface device 500 can be cleaved or separated from tab 123. Additionally, it should be understood that optoelectronic interface 500 can be also cleaved or sawn in other positions so as to remove optoelectronic interface device 500 from tabs 123 and 113. Further, by cleaving optoelectronic device 500 at dotted line 523, an optical surface 524 is formed on optical portion 142 and second optical portion 501. Optical surface 524 enables light signals 521 and 522 to enter and leave optical portion or core region 142 by any suitable method such as an optical connector, thereby operably coupling photonic device 516 and the plurality of electrical traces 508 to other electronic components or electronic systems.

In function, light signals, illustrated by arrows 521 and 522, emanating from either optical surface 521 or working portion 517 of photonic device 516 strike reflective surface 403, thereby reflecting light signals 521 and 522 toward working portion 517 of photonic device 516 or optical surface 524, respectively.

Figure 6:
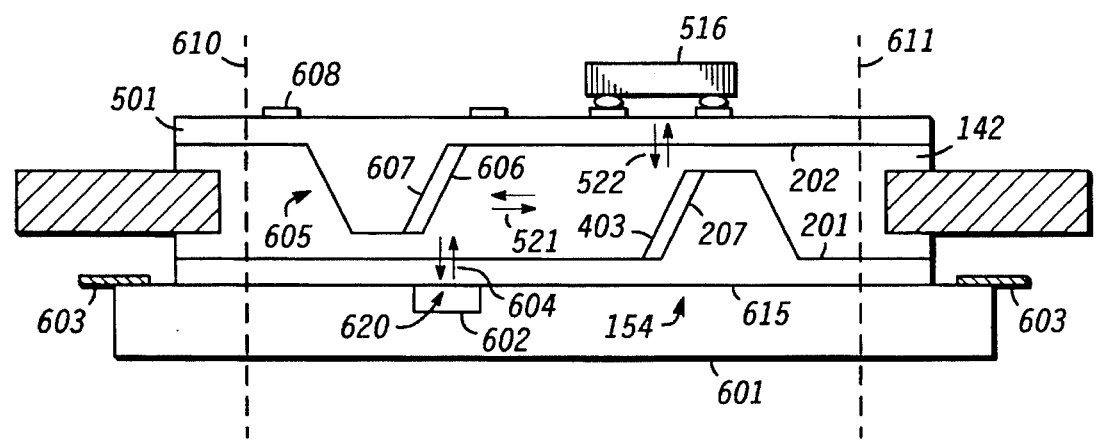
FIG. 6 is an enlarged simplified illustration of a sectional view of another optoelectronic interface device.

FIG. 6 is an enlarged simplified illustration of a sectional view through an optoelectronic interface device 600. For the sake of simplicity and for a better understanding of the present invention, similar features or elements described hereinbefore with reference to FIGS. 1, 2, 3, 4, and 5 will retain their original identifying numerals. Further, optical portion 142 described hereinabove will serve as an example of the optical portion.

Generally, optical interface device 600 is similar to optical interface device 500 illustrated in FIG. 5. However, several other elements have been introduced to FIG. 6, such as an interconnect substrate 601 having photonic device 602 with a working portion 620, electrical traces or bonding pads 603 and 608, an optical element 605 with a reflective surface 606, a reflective layer 607, light signals 604, and dotted lines 610 and 611.

Interconnect substrate 601 is any suitable interconnect substrate, such as a printed circuit board, a ceramic interconnect board, integrated circuit, or the like. Typically, interconnect substrate 601 provides a surface 615 having electrical tracings so as to interconnect a variety of electrical devices or components, such as transistors, capacitors, other integrated circuits, or the like to electrical traces 603 and photonic device 602.

Electrical traces 603 are any suitable input and output apparatus, such as a leadframe member, a wire bond, conductive bumps, or the like, thereby operably coupling electrical traces 603 to photonic device 602 and optoelectronic interface device 600. For example, with electrical trace 603 being a leadframe member both photonic devices 516 and 602 are operably coupled to the leadframe member, thus being able to input and output electrical signals to other electronic devices.

Photonic device 602 with working portion 620 is either a phototransmitter or a photoreceiver that either emits light of receives light, respectively, as indicated by arrows 604. When photonic device 602 is a phototransmitter, the phototransmitter is capable of being any suitable light emitting device, such as a light emitting diode (LED), a vertical cavity surface emitting laser (VCSEL), or the like. When photonic device 602 is a photoreceiver, photonic device 602 is any suitable light receiving device, such as a photodiode, a p-i-n photodiode, or the like. However in a preferred embodiment of the present invention, when photonic device 602 is a phototransmitter or when photonic device 602 is a photoreceiver, photonic device 602 is either a vertical cavity surface emitting laser (VCSEL) or a p-i-n photodiode, respectively.

As shown in FIG. 6, optical portion 142 is made having optical element 154 and optical element 605. Since optical element 154 has been described hereinabove, there is no need to further describe optical element 154. However, with regard to optical element 605, optical element 605 with reflective surface 606 and layer 607 are made in a similar fashion as optical element 154 with reflective surface 403 and layer 207 except that optical element 604 is formed in surface 202 of optical portion 142, thus enabling light signals 604 and 522 to be directed between photonic devices 602 and 516.

Electrical tracing or bonding pad 608 illustrates an electrical connection location that enables optoelectronic interface device 600 to be further coupled with other electronic components and systems. This type of coupling is discussed hereinabove with reference to electrical traces 603.

Dotted lines 610 and 611 provide examples of locations that optical portion 142 and second optical portion 501 may be cleaved so as to facilitate positioning of optoelectronic interface device 600 on interconnect substrate 601.

By now it should be appreciated that a novel optoelectronic interface device and method of making same have been provided. The design of the optoelectronic interface device incorporates methods of making such as molding so as to reduce cost and increase manufactureability, thereby enabling high volume manufacturing and integration with other electronic systems. Further, the optoelectronic interface allows planar photonic devices to be used easily. Additionally, the design and method of making of the optoelectronic interface device enables incorporation of standard electronic components in a highly manufacturable process.

We claim:

1. A method for making a plastic molded optoelectronic interface comprising the steps of:

providing a leadframe having a first segment and a second segment with the first segment having a first tab extending away from the first segment and the second segment having a second tab extending away from the second segment, the first segment and the second segment being positioned in a parallel configuration with the first and second tabs pointing toward each other;

forming an optical waveguide core portion of light conductive material with a first index of refraction, the optical waveguide core portion having a reflective surface with an angle, and the optical waveguide core portion extending from the first tab of the first segment to the second tab of the second segment; and forming an optical waveguide cladding portion surrounding the optical waveguide core portion, the optical waveguide cladding portion having a second index of refraction at least 0.01 less than the first index of refraction.

2. A method for making a plastic molded optoelectronic interface as claimed in claim 1 wherein, in the step of providing the leadframe, the leadframe is plastic.

3. A method for making a plastic molded optoelectronic interface as claimed in claim 1 wherein, in the step of providing the leadframe, the leadframe is metal.

4. A method for making a plastic molded optoelectronic interface as claimed in claim 1 wherein, in the step of forming the optical waveguide core portion having the reflective surface with the angle, the angle of the reflective surface ranges from 5 degrees to 85 degrees.

5. A method for making a plastic molded optoelectronic interface as claimed in claim 4 wherein, in the step of forming the optical waveguide core portion having the reflective surface with the angle, the angle of the reflective surface ranges from 35 to 55 degrees.

6. A method for making a plastic molded optoelectronic interface as claimed in claim 5 wherein, in the step of forming the optical waveguide core portion having the reflective surface with the angle, the angle of the reflective surface is 45.0 degrees.

7. A method for making a plastic molded optoelectronic interface as claimed in claim 1 wherein, in the step of forming the optical waveguide core portion having the reflective surface, the reflective surface is achieved by making a plane reflective surface.

8. A method for making a plastic molded optoelectronic interface as claimed in claim 1 wherein, in the step of forming the optical waveguide core portion having the reflective surface, the reflective surface is achieved by making a curved reflective surface.

9. A method for making a plastic molded optoelectronic interface comprising the steps of:

providing a leadframe having a first segment and a second segment with the first segment having a first tab extending away from the first segment and the second segment having a second tab extending away from the second segment, the first segment and the second segment being positioned in a parallel configuration with the first and second tabs pointing toward each other;

providing a first molding system having a first cavity;

placing the leadframe in the cavity of the first molding system;

injecting a molding compound into the first cavity of the first molding system so as to form an optical waveguide core portion with a refractive index ranging from 1.3 to 1.7 and having a reflective surface with an angle positioned to form an input/output of the optical waveguide core portion, the optical waveguide core portion extending from the first tab of the first segment to the second tab of the second segment;

providing a second molding system with a second cavity;

placing the optical waveguide core portion into the second cavity of the second molding system; and injecting a molding compound into the second cavity of the second molding system so as to form an optical waveguide cladding portion having a plane surface and surrounding the optical waveguide core portion, the optical waveguide cladding portion having a refractive index ranging from 1.3 to 1.7 and at least 0.01 less than the refractive index of the optical waveguide core portion.

10. A method for making a plastic molded optoelectronic interface as claimed in claim 9 wherein, in the step of providing the leadframe, the leadframe is plastic.

11. A method for making a plastic molded optoelectronic interface as claimed in claim 9 wherein, in the step of providing the leadframe, the leadframe is metal.

12. A method for making a plastic molded optoelectronic interface as claimed in claim 9 wherein, in the step of injecting the molding compound into the first cavity of the first molding system forming the first optical portion with a refractive index ranging from 1.3 to 1.7 and having the reflective surface with the angle, the angle of the reflective surface ranges from 85 degrees to 5 degrees.

13. A method for making a plastic molded optoelectronic interface as claimed in claim 12 further comprising the steps of:

removing the leadframe having the optical waveguide core portion and the optical waveguide cladding portion from the second cavity of the second molding system; and removing the first segment and the second segment from the optical waveguide core portion and the optical waveguide cladding portion.

14. A method for making a plastic molded optoelectronic interface as claimed in claim 9 wherein, in the step of injecting the molding compound into the first cavity of the first molding system forming the optical waveguide core portion with a refractive index ranging from 1.3 to 1.7 and having the reflective surface with the angle, the angle of the reflecting surface is 45 degrees.

15. A method for making a plastic molded optoelectronic interface as claimed in claim 9 wherein, in the step of injecting the molding compound into the first cavity of the first molding system forming the optical waveguide core portion with a refractive index ranging from 1.3 to 1.7 and having the reflective surface, the reflective surface is a plane.

16. A method for making a plastic molded optoelectronic interface as claimed in claim 9 wherein, in the step of injecting the molding compound into the first cavity of the first molding system forming the optical waveguide core portion with a refractive index ranging from 1.3 to 1.7 and having the reflective surface, the reflective surface is a curve.

* * * * *